United States Patent
Zotto et al.

(10) Patent No.: US 11,996,098 B2
(45) Date of Patent: May 28, 2024

(54) MISSED UTTERANCE RESOLUTIONS

(71) Applicant: Hewlett-Packard Development Company, L.P., Spring, TX (US)

(72) Inventors: Rafael Dal Zotto, Porto Alegre (BR); Franco Vieira e Souza, Porto Alegre (BR); Amit A. Marathe, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 305 days.

(21) Appl. No.: 17/418,626

(22) PCT Filed: Jun. 5, 2019

(86) PCT No.: PCT/US2019/035500
§ 371 (c)(1),
(2) Date: Jun. 25, 2021

(87) PCT Pub. No.: WO2020/246969
PCT Pub. Date: Dec. 10, 2020

(65) Prior Publication Data
US 2022/0101848 A1 Mar. 31, 2022

(51) Int. Cl.
*G10L 15/22* (2006.01)
*G06F 16/65* (2019.01)
*G06F 40/289* (2020.01)
*G06F 40/30* (2020.01)
*G10L 15/18* (2013.01)

(52) U.S. Cl.
CPC ............ *G10L 15/22* (2013.01); *G06F 16/65* (2019.01); *G06F 40/289* (2020.01); *G06F 40/30* (2020.01); *G10L 15/1815* (2013.01); *G10L 2015/223* (2013.01)

(58) Field of Classification Search
CPC ................ G10L 15/1815; G10L 15/22; G10L 2015/223; G06F 16/65; G06F 40/289; G06F 40/30
See application file for complete search history.

(56) References Cited

U.S. PATENT DOCUMENTS

| | | | |
|---|---|---|---|
| 9,053,708 B2 | 6/2015 | Koch et al. | |
| 9,141,665 B1* | 9/2015 | Munro | G06F 16/2453 |
| 10,043,517 B2 | 8/2018 | Blandin et al. | |
| 10,140,986 B2 | 11/2018 | Froelich | |
| 10,755,177 B1* | 8/2020 | Dabney | G06N 5/02 |
| 2009/0210808 A1* | 8/2009 | West | G06F 16/958 |
| | | | 715/764 |

(Continued)

*Primary Examiner* — Eric Yen
(74) *Attorney, Agent, or Firm* — Quarles & Brady LLP

(57) ABSTRACT

An example computing device can include a processing resource and a memory resource storing instructions thereon, the instructions executable by the processing resource to: log commands directed to the computing device, identify missed utterances from the logged commands, extract features from the missed utterances, wherein the features include an entity and a key phrase associated with the missed utterances, generate a list of the missed utterances based on a priority associated with the features associated with each of the missed utterances, and provide a portion of the missed utterances to a service for resolution, wherein the portion of the missed utterances are above a threshold priority within the list of the missed utterances.

15 Claims, 3 Drawing Sheets

(56) References Cited

U.S. PATENT DOCUMENTS

| | | |
|---|---|---|
| 2013/0253924 A1 | 9/2013 | Ichimura et al. |
| 2015/0106099 A1* | 4/2015 | Choi ................. G10L 15/30 |
| | | 704/246 |
| 2016/0055240 A1* | 2/2016 | Tur ................. G06F 40/284 |
| | | 707/706 |
| 2016/0077794 A1* | 3/2016 | Kim ................. G10L 15/20 |
| | | 704/275 |
| 2017/0116069 A1* | 4/2017 | Bender ............. G06F 11/0787 |
| 2018/0052913 A1 | 2/2018 | Gaskill et al. |
| 2018/0233139 A1* | 8/2018 | Finkelstein ......... G10L 15/1822 |
| 2018/0247648 A1 | 8/2018 | Nadimpalli et al. |
| 2018/0268818 A1 | 9/2018 | Schoenmackers et al. |
| 2018/0293221 A1 | 10/2018 | Finkelstein et al. |
| 2018/0308480 A1 | 10/2018 | Jang et al. |
| 2018/0330723 A1 | 11/2018 | Acero et al. |
| 2019/0035386 A1 | 1/2019 | Leeb et al. |
| 2021/0034817 A1* | 2/2021 | Asao ................. G06N 3/045 |

* cited by examiner

Figure 4

| MISSED UTTERANCE | ENTITIES | | KEY PHRASES |
|---|---|---|---|
| | ENTITY \| CATEGORY \| CONFIDENCE | | |
| 462-1: "WHAT WAS THE OVERALL HEALTH GRADE OF MY FLEET YESTERDAY" | Yesterday \| Date \| 0.98 | 464-1 | 466-1: • OVERALL HEALTH GRADE (0.99+)<br>• MY FLEET |
| 462-2: "WHAT DO YOU KNOW ABOUT RAFAEL ZOTTO DEVICE" | Rafael Zotto \| Person \| 0.99+ | 464-2 | 466-2: • RAFAEL ZOTTO DEVICE (0.72) |
| 462-3: "HOW MANY USERS AND HOW MANY ORDERS FITNICHE HAD LAST MONTH" | Last Month \| Date \| 0.93 | 464-3 | 466-3: • HOW MANY ORDERS (0.75)<br>• HOW MANY USERS (0.73)<br>• FITNICHE (0.97) |
| 462-N: "I NEED TO KNOW WHAT IS THE OVERALL PERFORMANCE FOR THE DEVICE CTN243E4" | CTN243E4 \| Com. Item \| 0.88 | 464-N | 466-N: • OVERALL PERFORMANCE (0.99+)<br>• DEVICE CTN243E4 (0.88) |

| MISSED UTTERANCE | SENTIMENT | | | |
|---|---|---|---|---|
| | NEUTRAL | POSITIVE | NEGATIVE | MIXED |
| 562-1: "WHY MY MACHINE IS SO SLOW TODAY? I ALMOST CAN'T WORK..." | 0.19 | 0.00 | 0.76 | 0.02 |
| 562-2: "MY NOTEBOOK IS FREEZING EVERY MORNING. WHAT IS HAPPENING?" | 0.18 | 0.02 | 0.74 | 0.04 |
| 562-N: "DO YOU KNOW WHY MCAFEE IS SO ANNOYING?" | 0.30 | 0.00 | 0.66 | 0.02 |

MISSED UTTERANCE RESOLUTIONS

BACKGROUND

Intelligent virtual assistants can be executed by a computing device. The intelligent virtual assistants can receive commands and perform tasks or services in response to the received commands. In some examples, the intelligent virtual assistants can utilize resources, such as databases, to perform the tasks or services.

BRIEF DESCRIPTION OF THE DRAWINGS

FIG. 4 is an example categorization table for performing missed utterance resolutions consistent with the present disclosure.

FIG. 5 is an example sentiment table for performing missed utterance resolutions consistent with the present disclosure.

DETAILED DESCRIPTION

Virtual assistants can receive commands from a user. In some examples, the commands can be provided to the virtual assistant through a microphone when the command is a vocal command. In other examples, the command can be provided to the virtual assistant through a textual command or other format that can be received by the virtual assistant or device associated with the virtual assistant. For example, the virtual assistant can be instructions that are executed by a computing device. In some examples, the computing device can be coupled to a plurality of devices that can be utilized to receive commands from a user and/or provide responses to the received commands. For example, the computing device can be coupled to a microphone to receive voice commands. In another example, the computing device can be coupled to a speaker to provide audio responses to the user. The computing device can include additional devices to receive commands and/or provide responses.

In some examples, the virtual assistant can receive a command that is classified as a missed utterance. As used herein, a missed utterance can include a command from a user where the virtual assistant is not capable of responding or performing the command. For example, a missed utterance can be a question from a user that the virtual assistant may not be capable of answering. For example, the answer to the question may not be included within a database utilized by the virtual assistant. In other examples, a missed utterance can include a command that the virtual assistant was not able to understand the command. For example, a missed utterance can include a phrase that was not recognizable to the virtual assistant. In this example, the phrase or command can be in a language that is not recognizable by the virtual assistant.

The present disclosure relates to systems and devices for performing missed utterance resolutions. As used herein, a resolution can include altering the virtual assistant to allow the virtual assistant to respond or perform a function in response to the command that created the missed utterance. For example, a resolution can include updating instructions associated with the virtual assistant such that the virtual assistance is capable of responding to the command that generated the missed utterance. The present disclosure relates to categorizing and prioritizing a plurality of missed utterances to determine a portion of the missed utterances for performing resolutions. In this way, virtual assistants can be updated or altered to provide a better quality of service to users.

Figure 1:
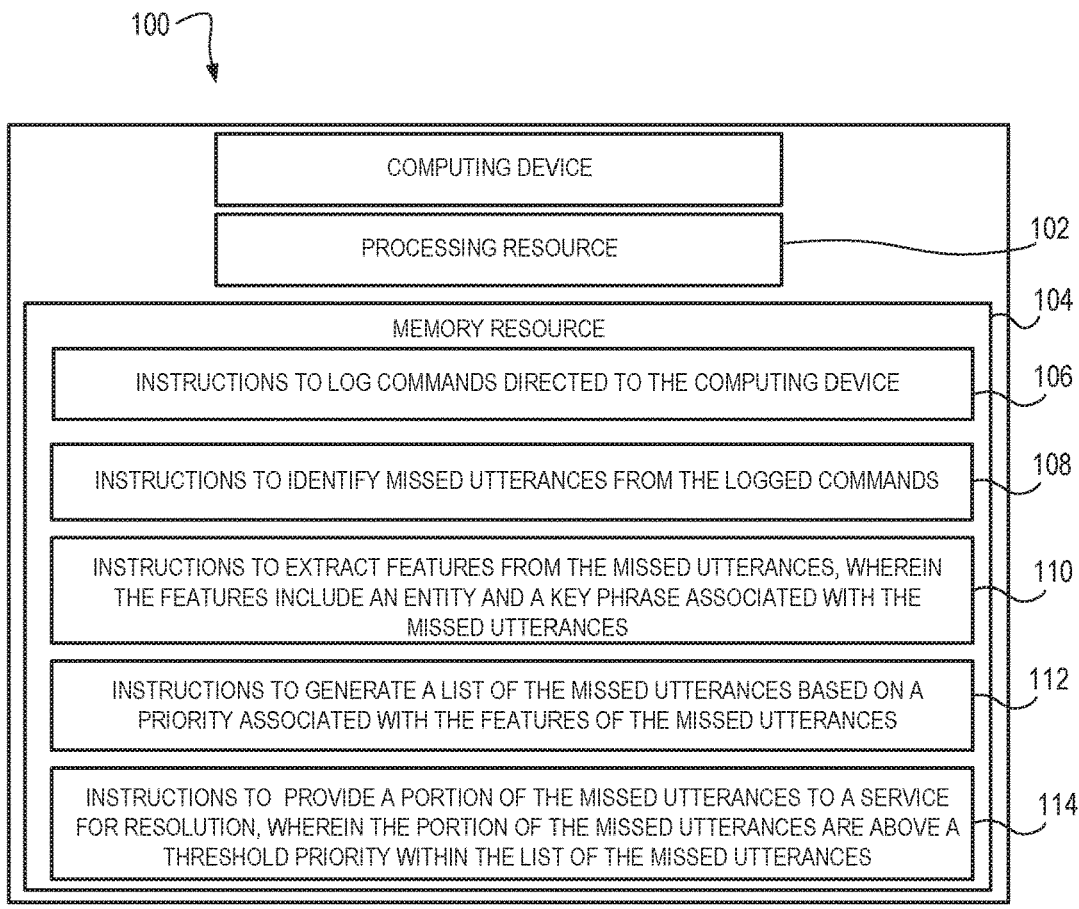
FIG. 1 is an example computing device for performing missed utterance resolutions consistent with the present disclosure.

FIG. 1 is an example computing device 100 for performing missed utterance resolutions consistent with the present disclosure. The computing device 100 can include a processing resource 102 communicatively coupled to a memory resource 104 storing instructions 106, 108, 110, 112, 114 to perform missed utterance resolutions as described herein. In some examples, the computing device 100 can be utilized to log commands directed to the computing device 100, identify missed utterances from the logged commands, and/or provide a portion of the missed utterances to a service for resolution.

Processing resource 102, as used herein, can include a number of processing resources capable of executing instructions stored by a memory resource 104. The instructions 106, 108, 110, 112, 114 (e.g., machine-readable instructions (MRI)) can include instructions stored on the memory resource 104 and executable by the processing resource 102 to implement a desired function (e.g., extract features from missed utterances, generate a list of the missed utterances based on a priority, etc.). The memory resource 104, as used herein, can include a number of memory components capable of storing non-transitory instructions that can be executed by processing resource 102.

The memory resource 104 can be in communication with the processing resource 102 via a communication link (e.g., path). The communication link can be local or remote to an electronic device associated with the processing resource 102. The memory resource 104 includes instructions 106, 108, 110, 112, 114. The memory resource 104 can include more or fewer instructions than illustrated to perform the various functions described herein. In some examples, instructions (e.g., software, firmware, etc.) 106, 108, 110, 112, 114 can be downloaded and stored in memory resource 104 (e.g., MRM) as well as a hard-wired program (e.g., logic), among other possibilities.

Instructions 106, when executed by a processing resource such as processing resource 102 can log commands directed to the computing device. As described herein, a command can be a description of task for the computing device to perform. For examples, a command can be, but not limited to: a question for the computing device, a request for the computing device to perform a function, a request for the computing device to alter other devices, among other requests or questions that can initiate a response from the computing device.

In some examples, the commands can be logged or saved in a database. As used herein, a database can be a memory resource that is capable of storing or saving data. In some examples, the commands can be logged with information that describes the command and response or function performed in response to the command. In some examples, the commands directed to the computing device 100 can be logged with commands that were directed to other computing devices and/or provided by other users. For example, a first computing device can receive commands from a first user or first group of users and a second computing device can receive commands from a second user or second group of users. In this example, the commands from the first computing device can be logged with the commands from the second computing device.

In some examples, the commands can be logged with additional information that corresponds to the commands. In some examples, the additional information can include, but is not limited to: a timestamp of when the command was received, a unique identifier of a user that initiated the command, a response the computing device performed, and/or a unique identifier of the computing device that received the command. In this way, the logged commands can represent commands associated with the virtual assistant across a plurality of physical devices executing the virtual assistant.

Instructions 108, when executed by a processing resource such as processing resource 102 can identify missed utterances from the logged commands. As described herein, a missed utterance can refer to a command that does not have a corresponding answer or function performed by the virtual assistant. In some examples, the missed utterances can be identified from the plurality of logged commands by reviewing the responses to the corresponding commands. For example, the missed utterances can be identified when a logged response to a command includes an error.

In another example, the missed utterances can be identified when the logged command includes an error. In some examples, the missed utterances can be identified when a plurality of commands are related to a particular subject. In these examples, the plurality of commands with a related subject can be analyzed to determine if the plurality of commands were associated with the same user within a particular time period, which can be utilized to identify a user attempting to rephrase the command due to the virtual assistant not responding in a particular way. In some examples, the missed utterances can be identified during the logging process and additional information can be logged with the command to indicate that the command is a missed utterance. In other examples, the additional information to indicate that a particular command is a missed utterance can be added to the logged command after the command is initially logged.

Instructions 110, when executed by a processing resource such as processing resource 102 can extract features from the missed utterances, wherein the features include an entity and a key phrase associated with the missed utterances. In some examples, the features of the missed utterances can include information related to the missed utterances. For example, the features of the missed utterances can include the language used in the command, a tone of the command, a subject of the command, an entity associated with the command, phrases within the language used in the command, and/or identified key phrases within the language used in the command.

As used herein, an entity of the missed utterance or command can include the subject or main topic associated with the missed utterance or command. For example, the entity of a missed utterance can be a date within the command, a name within the command, a device name within the command, a serial number or unique identifier of a device, among other topics that can be utilized to categorize the missed utterances. In some examples, the entity can be assigned a category. In some examples, the entity that is extracted from the missed utterance can be put into a category that broadly describes the extracted entity. For example, the entity can be "May $4^{th}$" and the category can be "date".

Instructions 112, when executed by a processing resource such as processing resource 102 can generate a list of the missed utterances based on a priority associated with the features of the missed utterances. In some examples, the instructions 112 can include instructions to prioritize the plurality of missed utterances based on the extracted features of the missed utterances. In these examples, a priority value can be assigned to each of the missed utterances. The priority value can be assigned based on a priority of an organization associated with the virtual assistant. For example, an organization that operates or distributes the virtual assistant or devices that utilize the virtual assistant can determine priority values based on the priorities of the organization. In some examples, the organization can utilize user feedback associated with the virtual assistant to determine a priority value. In other examples, the priority value can correspond to a quantity of missed utterances associated with a particular topic. In some examples, the instructions 112 can include instructions to assign a priority value to the entity and the key phrase associated with the missed utterances based on a relationship between the features and the computing device.

In some examples, the list of the missed utterances can be missed utterances that exceed a priority value threshold. In some examples, the list of missed utterances can be a list of topics or a list of categories that describe a particular type of missed utterance. For example, a plurality of missed utterances can reference a particular device. In this example, the list of missed utterances can include a reference to the particular device with a corresponding quantity of missed utterances that reference the particular device. In this way, the list of missed utterances can be a list of topics or categories that correspond to the plurality of missed utterances. In some examples, the instructions 112 can include instructions to generate a plurality of categories for the missed utterances based on the features. As described herein, the list of missed utterances is generated utilizing the plurality of categories. In addition, the priority value can be based on a tone or a sentiment associated with the missed utterances.

Instructions 114, when executed by a processing resource such as processing resource 102 can provide a portion of the missed utterances to a service for resolution, wherein the portion of the missed utterances are above a threshold priority within the list of the missed utterances. In some examples, the portion of the missed utterances can be provided to a service for resolution of each of the missed utterances.

As described herein, a resolution of the missed utterances can include altering the computing device 100 and/or the virtual assistant such that a future command related to the missed utterances may not result in a missed utterance. For example, the resolution of a particular missed utterance or topic associated with a missed utterance can include altering instructions of the virtual assistance such that the virtual assistant is capable of responding to the particular missed utterance or topic associated with the missed utterance. In some examples, the resolution includes determining a platform to retrieve a response for a particular missed utterance of the plurality of missed utterances. As used herein, a platform can be a computing device or computing system that can be utilized to provide a response to a particular command.

In some examples, the service can be a device or organization that make alterations or updates to the virtual assistant. For example, a missed utterance or topic associated with a missed utterance can be provided to a computing device or system that is utilized to alter instructions associated with virtual assistant. In some examples, the service can be a queue for altering the virtual assistant and the queue can be utilized by an organization for providing the resolution of the particular missed utterances. In this way, the computing device 100 can be utilized to identify, categorize, and prioritize missed utterances for resolution. Thus, the computing device 100 can be utilized to prioritize resources associated with the resolution of missed utterances, which can increase a quality of service more efficiently than previous systems.

Figure 2:
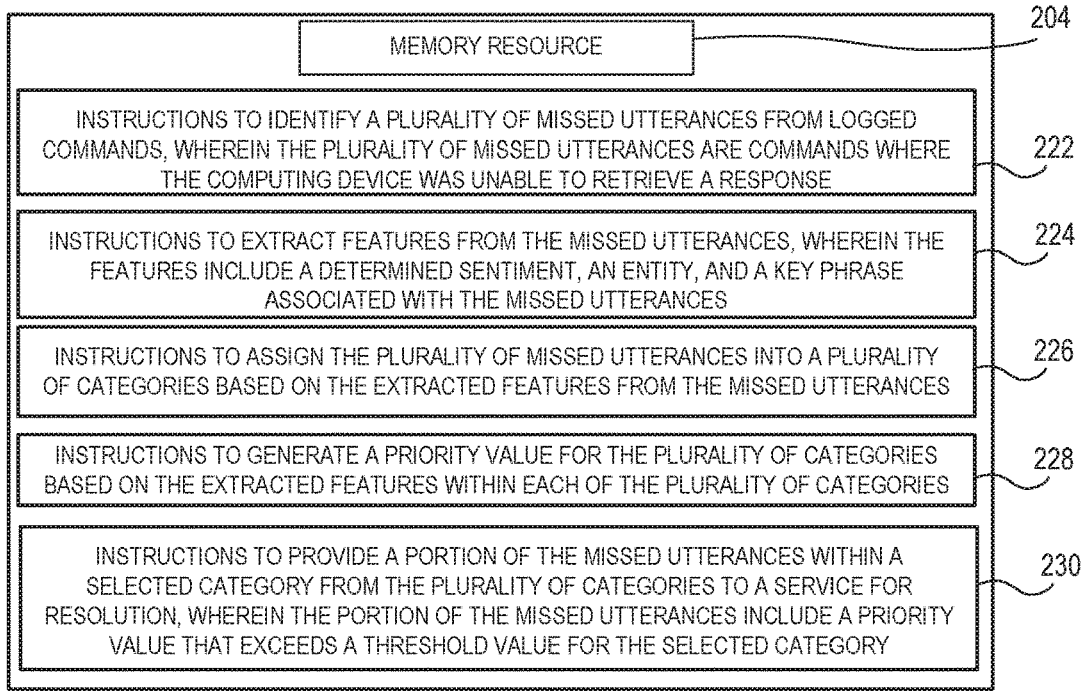
FIG. 2 is an example memory resource for performing missed utterance resolutions consistent with the present disclosure.

FIG. 2 is an example memory resource 204 for performing missed utterance resolutions consistent with the present disclosure. In some examples, the memory resource 204 can be a computer-readable storage medium as described herein. In some examples, the memory resource 204 can be communicatively coupled to a computing device (e.g., computing device 100 as referenced in FIG. 1, etc.) and/or other type of physical device (e.g. mobile virtual assistant device, smart speaker, home automation device, etc.) that can be utilized to provide responses or services in response to a command from a user.

The memory resource 204 can be in communication with a processing resource (e.g., processing resource 102 as referenced in FIG. 1, etc.) via a communication link (e.g., path). The communication link can be local or remote to an electronic device associated with the processing resource. The memory resource 204 includes instructions 222, 224, 226, 228, 230. The memory resource 204 can include more or fewer instructions than illustrated to perform the various functions described herein. In some examples, instructions (e.g., software, firmware, etc.) 222, 224, 226, 228, 230 can be downloaded and stored in memory resource 204 (e.g., MRM) as well as a hard-wired program (e.g., logic), among other possibilities.

Instructions 222, when executed by a processing resource, can identify a plurality of missed utterances from logged commands, wherein the plurality of missed utterances are commands where the computing device was unable to retrieve a response. As described herein, commands directed to a computing device and/or virtual assistant can be logged in a database. The logged commands can be categorized and/or organized based on a number of features of the missed utterances. The logged commands can include the language of the command as well as a corresponding response.

As described herein, the missed utterances can be identified by identifying errors associated with the commands and/or errors associated with the response to the commands. For example, a missed utterance can be identified if there was an error in processing or understanding the command and/or a missed utterance can be identified if there was an error in processing or understanding how to generate a response.

Instructions 224, when executed by a processing resource, can extract features from the missed utterances, wherein the features include a determined sentiment, an entity, and a key phrase associated with the missed utterances. As described herein, features of the missed utterances can include information that was logged with the command. For example, the features of the missed utterances can include a sentiment or tone of the command, an entity or topic of the command, and/or a key phrase associated with the command. As described herein, the features of the missed utterances can be extracted to be utilized to categorize and prioritize each of the plurality of missed utterances.

Instructions 226, when executed by a processing resource, can assign the plurality of missed utterances into a plurality of categories based on the extracted features from the missed utterances. In some examples, a plurality of categories can be created based on the features of identified missed utterances and additional missed utterances can be added to a created category based on the features of the additional missed utterances. In some examples, the plurality of categories can be created based on feedback received from users of the virtual assistant or computing device providing the virtual assistant.

In some examples, the plurality of categories can correspond to topics or potential updates that are being considered for the virtual assistant. For example, a category can correspond to a particular device that is associated with the virtual assistant, but that the virtual assistant is not capable of providing responses related to the particular device. In this example, a category can include missed utterances related to the particular device. In this example, the category and/or a portion of the missed utterances of the category can be provided to a service for resolution. In this example, the resolution can include altering the virtual assistant to provide resources such that the virtual assistant is capable of responding to commands related to the particular device.

Instructions 228, when executed by a processing resource, can generate a priority value for the plurality of categories based on the extracted features within each of the plurality of categories. In some examples, a priority value can represent a priority level or value of a category for an organization providing the virtual assistant. For example, the priority level can correspond to feedback from users and/or feedback from consultants on what may increase a quality of service for end users of the virtual assistant.

In some examples, the priority value can be calculated based on a quantity of missed utterances associated with a particular category. For example, each category can be analyzed to determine a quantity of missed utterances within the plurality of categories. For example, a first category can include a first quantity of missed utterances that corresponds to a first priority value and a second category can include a second quantity of missed utterances that corresponds to a second priority value. In this example, the first priority value can be a greater value than the second priority value when the first quantity of missed utterances is greater than the second quantity of missed utterances.

Instructions 230, when executed by a processing resource, can provide a portion of the missed utterances within a selected category from the plurality of categories to a service for resolution, wherein the portion of the missed utterances include a priority value that exceeds a threshold value for the selected category. As described herein, providing the missed utterances from the selected category to a service can include providing the missed utterances to a computing device or system for altering instructions or updating the virtual assistant.

In some examples, the threshold value can correspond to a threshold quantity of missed utterances within a particular quantity. For example, the threshold value can correspond to a particular quantity of missed utterances that is associated with a particular category. In this example, the particular quantity of missed utterances can indicate that particular quantity of users or percentage of users of the virtual assistant have been affected by the category of missed utterances. In this way, the priority level can indicate when a particular category of missed utterances should be resolved with a particular resolution.

In some examples, a resolution can be an alteration or upgrade to the computing device or virtual assistant. In some examples, a missed utterance can correspond to a particular function or response from the virtual assistant that the virtual assistant may not be capable of performing. In these examples, the service can be a device or system that is capable of performing the resolution that call allow the virtual assistant or device to perform the particular function that corresponds to the missed utterances.

Figure 3:
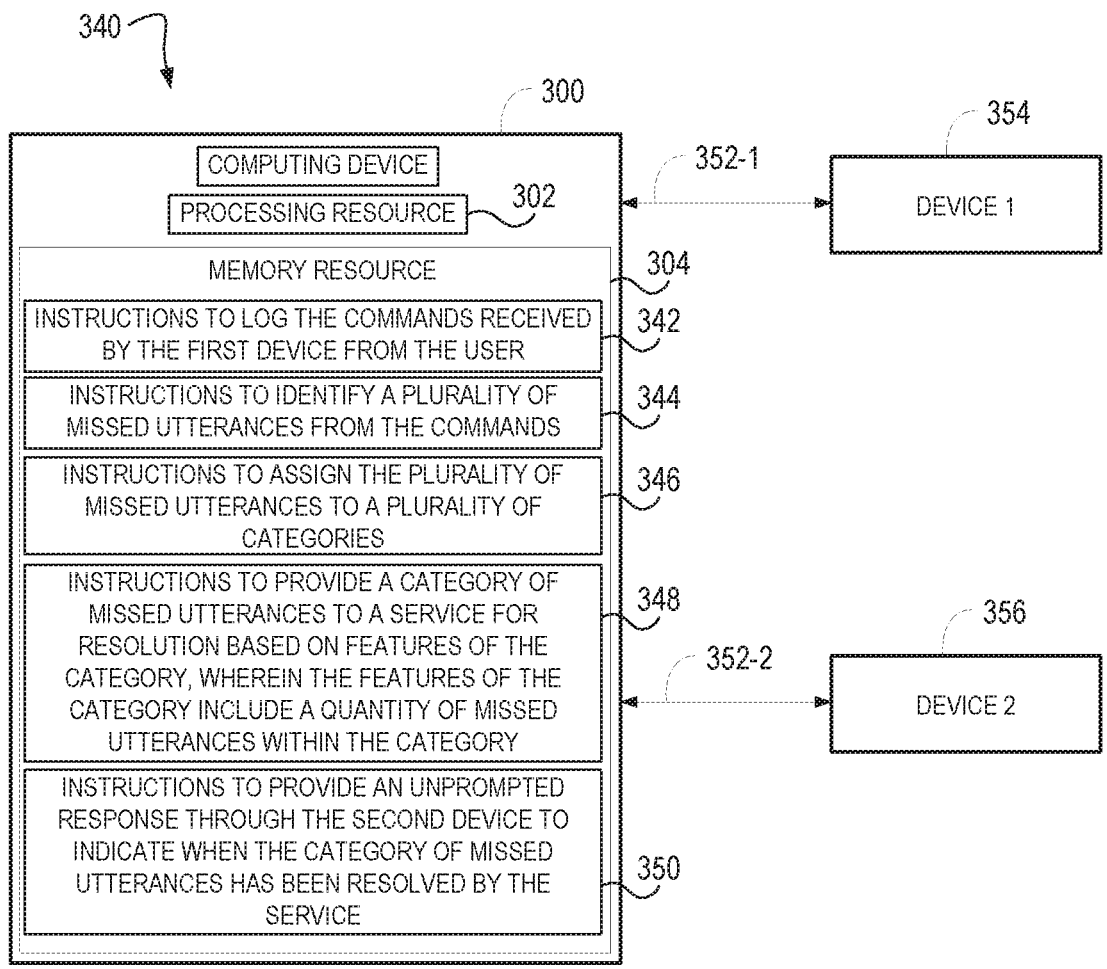
FIG. 3 is an example system for performing missed utterance resolutions consistent with the present disclosure.

FIG. 3 is an example system 340 for performing missed utterance resolutions consistent with the present disclosure. In some examples, the system 340 can include a computing device 300, a first device 354, and/or a second device 356. In some examples, the system 340 can illustrate separate and individual devices. In other examples, the system 340 can illustrate a plurality of components of a single device. For example, the computing device 300, first device 354, and second device 356 can be components of a single device for providing responses to user commands as described herein.

In some examples, the computing device 300 can be communicatively coupled to the first device 354 and/or the second device 356. In some examples, the first device 354 can be a device that can receive commands from a user. In some examples, the first device 354 can be a microphone, a video camera, a keyboard, and/or other types of input devices that can allow a user to provide a command to the computing device 300. In some examples, the second device 356 can be a device that can provide responses or perform functions in response to the received commands. For example, the second device 356 can be a speaker to provide audio responses to a user and/or a display to provide visual responses to a user.

In other examples, the second device 356 can be a processing resource that can provide instructions to other devices to perform function in response to commands. For example, the second device 356 can alter a function of a light bulb in response to a command to alter the function of the light bulb. In this example, the second device 356 can be utilized to send instructions to the light bulb to alter the function. Thus, in some examples, the first device 354 can receive commands from a user and the second device 356 can provide responses to the user.

In some examples, the computing device 300 can include a processing resource 302 and memory resource 304 storing instructions 342, 344, 346, 348, 350 that are executable by the processing resource 302 to perform particular functions. Instructions 342, when executed by a processing resource 302, can log the commands received by the first device from the user.

Instructions 344, when executed by a processing resource 302, can identify a plurality of missed utterances from the commands. As described herein, a user can provide a command to the computing device 300 utilizing the first device 354. For example, the command can be an instruction to turn off a light that a user speaks into a microphone when the first device 354 is a microphone. The first device 354 can provide the command to the computing device 300 to be analyzed.

In some examples, the computing device 300 can convert a vocal command into a text command. In other examples, the computing device 300 can alter a format of the command to a computer readable command. For example, the computing device 300 can alter the format of the command such that the computing device 300 can read and determine a response to the command.

In some examples, the computing device 300 can identify the plurality of missed utterances when the computing device 300 is not capable of determining a response to the command. For example, the computing device 300 may not be capable of answering a question related to a particular topic. In this example, the computing device 300 can identify that the question is a missed utterance when the computing device 300 determines that it is not capable of answering the question.

In some examples, the commands received by the computing device 300 can be logged in a database. In some examples, the missed utterances can be store with the commands and in other examples, the missed utterances can be stored in a separate database than the commands. In other examples, the commands and missed utterances can be logged together and the missed utterances can be labeled to identify the missed utterances from commands that include a corresponding response.

Instructions 346, when executed by a processing resource 302, can assign the plurality of missed utterances to a plurality of categories. As described herein, the features of the plurality of missed utterances can be utilized to identify an existing category for the missed utterance or whether a new category should be generated for the missed utterance. In some examples, the category can correspond to a particular topic, particular response, and/or particular capability of receiving commands. For example, the topic can be a particular device, particular name, particular time period, among other topical features of the missed utterance. In another example, the particular response can be a response or function that was requested by a command that the computing device 300 was not capable of performing when the command was provided. Furthermore, the capability of receiving commands can be a language capability. For example, the computing device 300 may not be able to alter a command in a particular language to a computer readable command. In this example, a resolution can include an update to allow the computing device 300 to convert the particular language to the computer readable command.

Instructions 348, when executed by a processing resource 302, can provide a category of missed utterances to a service for resolution based on features of the category, wherein the features of the category include a quantity of missed utterances within the category. As described herein, a category of missed utterances or a portion of missed utterances from a category can be provided to a service. In some examples, the service can be a device or system to alter a functionality of the virtual service and/or computing device 300.

In some examples, the service can be utilized to upgrade a function of the computing device 300 based on the category and/or portion of missed utterances. For example, the category can be utilized to identify a feature that the computing device 300 is not capable of performing. In this example, the service can alter the function of the computing device 300 to allow the computing device 300 or virtual assistant to perform the feature identified by the category or portion of missed utterances within the category.

As described herein, the category to be provided to the service can be based on features of the category. As described herein, the feature of the category can include a quantity of missed utterances within the category. In this way, the service can alter a functionality of the virtual assistant or computing device 300 to provide additional services that have previously been requested through the plurality of commands that resulted in the plurality of missed utterances within the category.

In some examples, the features can include user information associated with the user that provided the command. In this way, the user information can be utilized when determining a priority value. For example, a higher priority user can be a user that an organization that provides the virtual assistant or computing device 300 that is relatively more important compared to other users of the virtual assistant or computing device 300. In some examples, the features can include a tone or sentiment of the plurality of missed utterances within the category. In these examples, the sentiment can be utilized with the other features to determine a priority value. That is, a relatively negative sentiment can increase the priority value associated with a particular missed utterance since a negative sentiment can indicate that a user is frustrated with the virtual assistant or computing device 300.

Instructions 350, when executed by a processing resource 302, can provide an unprompted response through the second device 356 to indicate when the category of missed utterances has been resolved by the service. As used herein, an unprompted response can include a response by the computing device 300 that was not prompted or commanded by a user. For example, the computing device 300 can determine a presence of a user within a particular area. In this example, the computing device 300 can provide an unprompted response to indicate to the user that there is additional functionality that is being provided by the computing device 300. In some examples, the unprompted response can notify a user associated with the particular missed utterance when a resolution of the particular missed utterance has been performed by the service and/or is capable of being performed by the service.

In a particular example, the computing device 300 can receive a first command related to a first topic. In this example, the first command can result in a missed utterance when the computing device 300 is not capable of responding to the first command. In this example, the missed utterance can be provided to a service to alter a functionality of the computing device 300 such that the computing device 300 is capable of responding to the first command. In this example, the computing device 300 can receive a second command related to a second topic. The computing device 300 can respond to the second command and without being prompted about the first topic, can provide a message or notification to the user that the computing device 300 is capable of responding to the first command.

In some examples, the computing device 300 can respond to a first missed utterance by providing a clarification question to a user associated with the first missed utterance and provide a medium for the user to submit a response to the clarification question. For example, the computing device 300 can determine a word or phrase that the computing device 300 does not understand. In this example, the computing device 300 can provide a clarification question to the user that provided the command. In this example, the computing device 300 can provide a medium, such as the second device 356, to provide a response to the question, which can provide enough information for the computing device 300 to respond to the command. In some examples, the respond provided by the user can be stored with the command as a missed utterance. In this way, follow up questions and responses from the user can be stored as a missed utterance. That is, a first missed utterance can be logged with the response to the clarification question when the response is categorized as a second missed utterance.

In some examples, the computing device 300 can provide an unprompted response with a question to the user whether the user would like the computing device 300 to respond to a command that was previously logged as a missed utterance. In this way, the computing device 300 can provide updates to a user that indicate the computing device 300 has altered or upgraded functionality. These updates can provide a better user experience with the computing device 300 by providing updates that are specific to the user's previous interactions with the computing device. In addition, since the updates correspond to a user's previous interactions with the computing device, unprompted responses may not be unwanted responses that could negatively affect a user's experience with the computing device 300.

FIG. 4 is an example categorization table 460 for performing missed utterance resolutions consistent with the present disclosure. In some examples, the categorization table 460 can be utilized by a computing device (e.g., computing device 100 as referenced in FIG. 1, computing device 300 as referenced in FIG. 3, etc.) to determine the entities 464 and/or key phrases 466 associated with a particular missed utterance 462. As described herein, determining the entities 464 and/or key phrases 466 can be utilized to determine a category for the missed utterances 462.

In some examples, the categorization table 460 can include a plurality of missed utterances 462-1, 462-2, 462-3, 462-N. In some examples, the plurality of missed utterances 462-1, 462-2, 462-3, 462-N can include the language of a command to a computing device or virtual assistant. For example, the plurality of missed utterances 462-1, 462-2, 462-3, 462-N can represent a text format or computer readable format of a voice command provided to a microphone communicatively coupled to the computing device. In some examples, the plurality of missed utterances 462-1, 462-2, 462-3, 462-N have been identified as missed utterances when the computing device or virtual assistant is not capable of responding to the command associated with the plurality of missed utterances 462-1, 462-2, 462-3, 462-N.

In some examples, the categorization table 460 can include entities 464 associated with each of the plurality of missed utterances 462-1, 462-2, 462-3, 462-N. For example, missed utterance 462-1 can include entities 464-1, missed utterance 462-2 can include entities 464-2, and/or missed utterance 462-N can include entities 464-N. As described herein, the plurality of entities 464-1, 464-2, 464-3, 464-N can include features of the corresponding plurality of missed utterances 462-1, 462-2, 462-3, 462-N that have been extracted. For example, the plurality of entities 464-1, 464-2, 464-3, 464-N can each include an entity or topic of the corresponding plurality of missed utterances 462-1, 462-2, 462-3, 462-N, a category of the corresponding plurality of missed utterances 462-1, 462-2, 462-3, 462-N, and/or a confidence of the corresponding plurality of missed utterances 462-1, 462-2, 462-3, 462-N.

As used herein, the entity or topic of the corresponding plurality of missed utterances 462-1, 462-2, 462-3, 462-N can be the subject or main idea of the corresponding missed utterance from the plurality of missed utterances 462-1, 462-2, 462-3, 462-N. For example, the entity of the missed utterance 462-1, which states "what was the overall health of my fleet yesterday" can be "yesterday". In this example, the main idea or entity of this missed utterance 462-1 is the date of yesterday. This can indicate that a user that provided the command was interested in retrieving historical data.

As used herein, the category of the corresponding plurality of missed utterances 462-1, 462-2, 462-3, 462-N can be a concept that includes a plurality of different entities for the plurality of missed utterances 462-1, 462-2, 462-3, 462-N. In the example above with regards to the missed utterance 462-1, the category can be "date" since the entity was "yesterday". In this way, the missed utterance 462-1 can be within the category of date to indicate that the virtual assistant or computing device may not be capable of responding to a command that includes a particular date and time.

As used herein, a confidence of the entities 464 can indicate a likelihood that the entity and/or category for a corresponding missed utterance 462 is correctly identified. In some examples, the confidence of the entities 464 can indicate whether the corresponding missed utterance 462 is categorized in the category that was selected, whether the corresponding missed utterance 462 should be changed to a different category, and/or whether the corresponding missed utterance 462 should be put in multiple categories.

In some examples, the plurality of missed utterances 462-1, 462-2, 462-3, 462-N can include corresponding key phrases 466-1, 466-2, 466-3, 466-N. In some examples, the key phrases 466 can include a group of words within the plurality of missed utterances 462-1, 462-2, 462-3, 462-N that describe information that may need to be utilized to response to the command that corresponds to the plurality of missed utterances 462-1, 462-2, 462-3, 462-N. In the example above relating to the missed utterance 462-1, the key phrase 466-1 can include "overall health grade" and/or "my fleet". In this example, the information that would be needed to respond to the missed utterance 462-1 can include information related to the "overall health grade" and/or information related to "my fleet". In this example, the missed utterance 462-1 can be provided to a service that is capable of providing the information related to the "overall Health grade of a fleet".

FIG. 5 is an example sentiment table 570 for performing missed utterance resolutions consistent with the present disclosure. In some examples, the sentiment table 570 can be utilized to be a computing device and/or virtual assistant to determine a sentiment or tone of a plurality of missed utterances 562-1, 562-2, 562-N. In some examples, the plurality of missed utterances 562-1, 562-2, 562-N can be the same or similar as missed utterances 462-1, 462-2, 462-3, 462-N as referenced in FIG. 4.

As described herein, the sentiment table 570 can be utilized to determine a priority of a category and/or a priority of the plurality of missed utterances 562-1, 562-2, 562-N. For example, a first missed utterance from the plurality of missed utterances 562-1, 562-2, 562-N with a relatively negative tone or sentiment can have a higher priority value compared to a second missed utterance from the plurality of missed utterances 562-1, 562-2, 562-N with a relatively positive tone or sentiment. In this way, the overall sentiment toward the virtual assistant or computing device can be increased more efficiently. In addition, the sentiment of a missed utterance can indicate an importance or severity of the issue related to the missed utterance.

In some examples, the sentiment table 570 can include a plurality of sentiments 574-1, 574-2, 574-N that correspond to the plurality of missed utterances 562-1, 562-2, 562-N. For example, the sentiment 574-1 can correspond to the missed utterance 562-1. In some examples, each of the plurality of sentiments 574-1, 574-2, 574-N can include a neutral value, a positive value, a negative value, and/or a mixed value. As used herein, a neutral value indicates a percentage of the corresponding missed utterance that is deemed to be a neutral sentiment (e.g., includes neither positive or negative sentiments, etc.). As used herein, a positive value indicates a percentage of the corresponding missed utterance that is deemed to be a positive sentiment (e.g., joyful, happy, upbeat, positive feedback, etc.). As used herein, a negative value indicates a percentage of the corresponding missed utterance that is deemed to be a negative sentiment (e.g., sad, angry, frustrated, mad, negative feedback, etc.). As used herein, a mixed value indicates a percentage of the corresponding missed utterance that is deemed to be a mixed sentiment (e.g., includes both positive and negative sentiments, etc.).

In some examples, the plurality of missed utterances 562-1, 562-2, 562-N can be analyzed to determine the corresponding plurality of sentiments 574-1, 574-2, 574-N. For example, the textual language can be analyzed to determine the corresponding plurality of sentiments 574-1, 574-2, 574-N. In this example, the analysis of the textual language can include the sentence structure, the word choice, and/or the punctuation. In another example, the voice command that was received and converted into the textual language can be analyzed to determine the corresponding plurality of sentiments 574-1, 574-2, 574-N. In this example, the tone of the voice command, the volume of the voice command, the word choice of the voice command, and/or the strain of the voice command can be utilized to determine the corresponding plurality of sentiments 574-1, 574-2, 574-N. Other attributes or features of the plurality of missed utterances 562-1, 562-2, 562-N can be utilized to identify the sentiment or tone of the plurality of missed utterances 562-1, 562-2, 562-N.

In a specific example, the missed utterance 562-1 can include the text "why my machine is so slow today? I almost can't work.". The language and word choice of the missed utterance 562-1 can be analyzed as described herein to produce a neutral value of 0.19, a positive value of 0.00, a negative value of 0.76, and a mixed value of 0.02. In this example, the relatively high negative value of 0.76 can be utilized to determine that the missed utterance 562-1 has a relatively negative sentiment from the user. Thus, in some examples, the priority value of the missed utterance 562-1 can be increased based on the sentiment value. In this way, the priority values of the plurality of missed utterances 562-1, 562-2, 562-N can be based in part on the sentiment of the corresponding plurality of missed utterances 562-1, 562-2, 562-N.

As described herein, the categorization and prioritization of the plurality of missed utterances 562-1, 562-2, 562-N can be utilized to determine which of the plurality of missed utterances 562-1, 562-2, 562-N are to be sent to a service for resolution such that resources can be allocated to resolving missed utterances that are a priority to the end user and/or the organization providing the virtual assistant or computing device.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure and should not be taken in a limiting sense. Further, as used herein, "a number of" an element and/or feature can refer to any number of such elements and/or features.

What is claimed:

1. A computing device, comprising:
 a processing resource; and
 a memory resource storing instructions thereon, the instructions executable by the processing resource to:
  log commands directed to the computing device;
  identify missed utterances from the logged commands;
  extract features from the missed utterances, wherein the features include an entity and a key phrase associated with the missed utterances;

generate a list of the missed utterances based on a priority associated with the features of the missed utterances; and provide a portion of the missed utterances to a service for resolution, wherein the portion of the missed utterances are above a threshold priority within the list of the missed utterances.

2. The computing device of claim 1, comprising instructions executable by the processing resource to assign a priority value to the entity and the key phrase associated with the missed utterances based on a relationship between the features and the computing device.

3. The computing device of claim 1, comprising instructions executable by the processing resource to generate a plurality of categories for the missed utterances based on the features.

4. The computing device of claim 3, wherein the list is generated utilizing the plurality of categories.

5. The computing device of claim 1, wherein the priority is based on a sentiment associated with the missed utterances.

6. A non-transitory computer-readable storage medium comprising instructions that, when executed, cause a processor of a computing device to:

identify a plurality of missed utterances from logged commands, wherein the plurality of missed utterances are commands where the computing device was unable to retrieve a response;

extract features from the missed utterances, wherein the features include a determined sentiment, an entity, and a key phrase associated with the missed utterances;

assign the plurality of missed utterances into a plurality of categories based on the features from the missed utterances;

generate a priority value for the plurality of categories based on the features; and provide a portion of the missed utterances within a selected category from the plurality of categories to a service for resolution, wherein the portion of the missed utterances include a priority value that exceeds a threshold value for the selected category.

7. The non-transitory computer-readable storage medium of claim 6, wherein the resolution includes determining a platform to retrieve a response for a particular missed utterance of the plurality of missed utterances.

8. The non-transitory computer-readable storage medium of claim 7, comprising instructions that, when executed, cause a processor of a computing device to notify a user associated with the particular missed utterance when a resolution of the particular missed utterance has been performed by the service.

9. The non-transitory computer-readable storage medium of claim 8, wherein the instructions to notify the user includes instructions to provide an unprompted response to the user corresponding to the particular missed utterance.

10. The non-transitory computer-readable storage medium of claim 6, comprising instructions that, when executed, cause a processor of a computing device to:

respond to a first missed utterance by providing a clarification question to a user associated with the first missed utterance; and provide a medium for the user to submit a response to the clarification question.

11. The non-transitory computer-readable storage medium of claim 10, wherein the first missed utterance is logged with the response to the clarification question when the response is categorized as a second missed utterance.

12. A system comprising:

a first device to receive commands from a user;

a second device to provide responses to the user; and a computing device, comprising instructions executable by a processor to:

log the commands received by the first device from the user;

identify a plurality of missed utterances from the commands;

assign the plurality of missed utterances to a plurality of categories;

provide a category of missed utterances to a service for resolution based on features of the category, wherein the features of the category include a quantity of missed utterances within the category; and provide an unprompted response through the second device to indicate when the category of missed utterances has been resolved by the service.

13. The system of claim 12, wherein the features of the category include user information associated with the user.

14. The system of claim 12, wherein the features of the category include a tone of the plurality of missed utterances within the category.

15. The system of claim 12, wherein the service includes instructions to provide a response to missed utterances associated with the category.

* * * * *